United States Patent [19]

Bromley

[11] 4,386,776
[45] Jun. 7, 1983

[54] ELECTRONIC SPORTS-ACTION GAME WITH IMPROVED GAME-OBJECT SIMULATION

[75] Inventor: Eric Bromley, West Simsbury, Conn.

[73] Assignee: Coleco Industries, Inc., Hartford, Conn.

[21] Appl. No.: 234,903

[22] Filed: Feb. 17, 1981

[51] Int. Cl.³ ............................................. A63F 7/06
[52] U.S. Cl. ............................... 273/85 G; 273/1 GC
[58] Field of Search ................. 273/1 E, 1 GC, 85 G, 273/88, 94, DIG. 28, 313

[56] References Cited

U.S. PATENT DOCUMENTS

| | | | |
|---|---|---|---|
| 2,471,841 | 5/1949 | Sells | 200/6 |
| 2,589,025 | 3/1952 | Phelps | 200/16 |
| 3,005,055 | 10/1961 | Mattke | 179/90 |
| 3,223,792 | 12/1965 | Strother | 200/6 |
| 3,874,669 | 4/1975 | Ariano et al. | 273/DIG. 28 |
| 3,874,669 | 4/1975 | Ariano | 273/85 R |
| 4,006,474 | 2/1977 | Lukkarila | 340/324 AD |
| 4,026,048 | 5/1977 | Hill et al. | 37/42 R |
| 4,026,555 | 5/1977 | Kirschner et al. | 273/85 R |
| 4,027,119 | 5/1977 | Tezuka | 200/6 |
| 4,029,915 | 6/1977 | Ojima | 200/5 A |
| 4,041,258 | 8/1977 | Harada | 200/6 A |
| 4,093,221 | 6/1978 | Dash | 273/DIG. 28 |
| 4,124,787 | 11/1978 | Aamoth et al. | 200/6 A |
| 4,142,180 | 2/1979 | Burson | 340/709 |
| 4,171,470 | 10/1979 | Gettig | 200/6 A |
| 4,218,702 | 8/1980 | Brocard et al. | 358/109 |
| 4,230,916 | 10/1980 | Mochizuki | 200/6 |
| 4,249,734 | 2/1981 | Bromley | 273/94 |
| 4,249,735 | 2/1981 | Bromley | 273/94 |

FOREIGN PATENT DOCUMENTS

| | | |
|---|---|---|
| 810733 | 5/1974 | Belgium . |
| 2408027 | 5/1975 | Fed. Rep. of Germany . |
| 2807231 | 8/1978 | Fed. Rep. of Germany ... 273/DIG. 28 |
| 2826731 | 12/1978 | Fed. Rep. of Germany . |
| 7414327 | 5/1976 | Netherlands . |

OTHER PUBLICATIONS

"Electronic Sea Battle from the Mego Corp."; Apr. 1979; Playthings Magazine, p. 28.

Primary Examiner—Vance Y. Hum
Assistant Examiner—Leo P. Picard

[57] ABSTRACT

An electronic game device has a main body and a central removable cartridge. The main body contains circuitry for simulating football, basketball, soccer, and hockey, and the removable cartridge has overlays that register with LEDs on the main body and contain markings peculiar to the game to be simulated. The cartridge also includes a printed-circuit board that is electrically connected to the circuitry to indicate which game is to be simulated. In the basketball, soccer, and hockey versions of the game, two player symbols on each side are provided as well as a game-object symbol, and the game-object symbol can be displayed in a mode in which it remains stationary during a continuing play independently of the movement of any other play symbol. In one version of the game, the game-object symbol, upon encountering the playing-field boundary during pass simulations, is diverted to travel along the boundary. In another version, scoring can be accomplished both by shooting the game-object symbol into a goal position and by maneuvering it to the goal position under the control of a player symbol.

9 Claims, 27 Drawing Figures

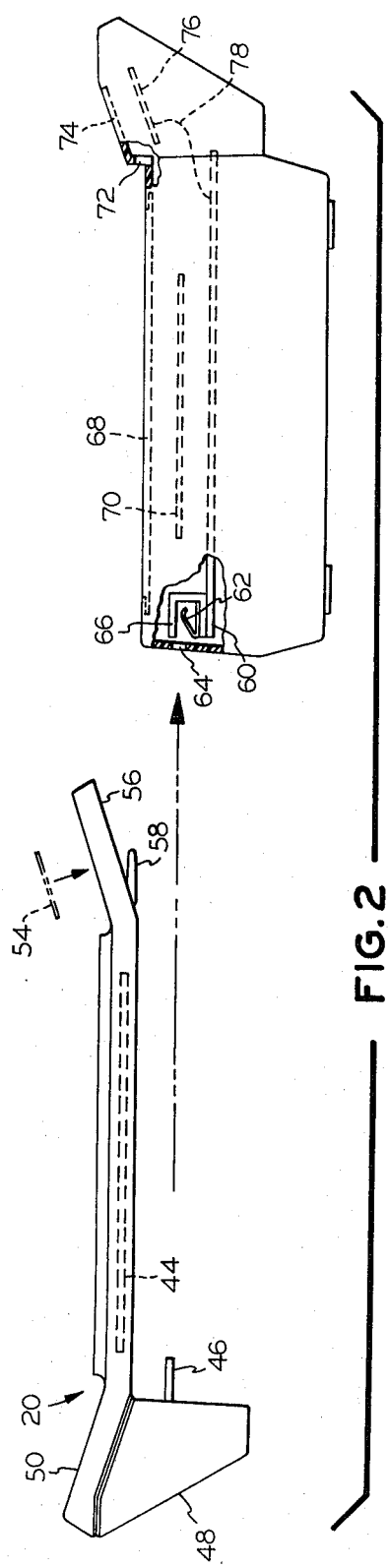
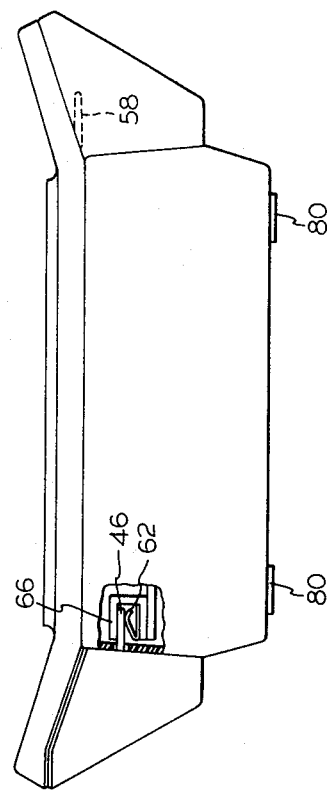
FIG.2
FIG.3

ELECTRONIC SPORTS-ACTION GAME WITH IMPROVED GAME-OBJECT SIMULATION

BACKGROUND OF THE INVENTION

The present invention is directed to electronic games, particularly those of the type in which the game action is simulated on a matrix of discrete visual-image-producing devices.

The recent popularity of electronic games has provided great impetus to those who manufacture them to improve their play value. Being such a subjective concept, "play value" is difficult to define and pat prescriptions for its achievement are quite naturally unavailable. However, in a general sense, one factor that contributes to play value is the variety of play situations that can be encountered during the play of the game. The increase in play situations can be provided by increasing the number of play symbols, the size of the playing area, or the number of controls. Accordingly, a fair amount of effort has been expended toward these ends.

Most electronic games simulate "real" sports of the type that is played on some kind of playing field, such as a basketball court or a hockey rink, between teams of players, and game development has largely concentrated on the number, control, and variety of these players. Many electronic games have also provided symbols for game objects, such as basketballs, footballs, and hockey pucks, and the provision of such game-object symbols has added a dimension to the possibilities available. However, no serious development of the potential provided by the game object has been achieved up to now.

It is accordingly the object of the present invention to provide game features that increase the play value of the electronic game by enhancing the capabilities of the game object.

SUMMARY OF THE INVENTION

The foregoing and related objects are achieved in an electronic sports-action game that includes a housing, a display panel on the upper surface of the housing, an operational-circuit means disposed inside the housing, and a control board on the housing that includes a multiplicity of manually operable control elements. The display panel includes a visual simulation of a playing field that is adapted to display symbols at discrete positions on the playing field between side and end boundary lines in response to electrical signals. The simulated playing field is of the type on which a game is played between two teams, each of which attempts to maneuver a game object into a goal associated with it and thereby achieve a score. The display panel simulates a goal associated with one team, the goal being located at a goal position that includes at least one of the discrete positions in that end of the playing field defended by the other team. The display panel also simulates another goal associated with the other team and located at a goal position that includes at least one of the discrete positions in that end of the playing field defended by the one team.

The operational-circuit means is electrically connected to the display panel for generation and transmission of the electrical signals to the display panel to produce symbols on the simulated playing field. The symbols include offensive-player symbols, which simulate players of the team currently on offense, and defensive-player symbols, which simulate players of the team currently on defense. Also produced is a game-object symbol, which simulates a game object in two modes. The first mode is a control mode, in which the game-object symbol moves with an offensive-player symbol to simulate the game object under control of that simulated player. The other mode is an independent mode, in which the game-object symbol moves independently of the player symbols.

The operational-circuit means includes means for moving at least one offensive-player symbol, at least one defensive-player symbol, and the game-object symbol about the playing field. It also includes coincidence-detection means and means for monitoring play action. The means for moving at least one offensive-player symbol moves the game-object symbol when the game object is simulated to be under control of the offensive-player symbol being moved. The game-object movement means is operable to move the game-object symbol independently of the player symbols when simulation of the game object is in the independent mode. The game-object movement means is operable to move the game object in a straight-line path to simulate a "pass" or a "shot" of the game object. In one of the illustrated embodiments of the invention, the game-object movement means diverts the game-object symbol from its straight-line path when at least one of the boundary lines is encountered during independent motion, and it continues the independent motion of the game-object symbol along the boundary line.

The coincidence-detection means detects coincidence between the game-object symbol and a goal position during a simulated shot from a player symbol of the team associated with the goal position. It thereby detects a score. In one of the illustrated embodiments, the coincidence-detection means also detects coincidence between the game-object symbol and the goal position associated with the team currently on offense while the game object is being simulated in the control mode. A score can thereby be made in both modes of game-object simulation. In that same embodiment, the coincidence-detection means also detects coincidence between a defensive-player symbol and the offensive-player symbol that has simulated control of the game object. Upon such detection, the game-object movement means institutes the independent mode of game-object simulation.

The means for monitoring play action records information concerning the status of the simulated game, and it produces signals indicative of the status information. Those signals convey the recorded information to an operator of the game.

The manually operable control elements in the control board are connected to the operational-circuit means for transmission of the electrical signals to it through manual operation of the control elements. At least one of the manually operable control elements is operable to transmit signals to the operational-circuit means to produce manually controlled movement of at least one of the offensive-player symbols. Also, at least one of the manually operable control elements is operable to transmit signals to the operational-circuit means for production by the game-object movement means of the straight-line movement of the game-object symbol, the straight-line movement being independent of the movement of the player symbols. Preferably, the straight-line motion is stopped by the game-object movement means upon independent movement of the game object to a predetermined number of positions along the straight-line path, the predetermined number being less than the number of discrete positions along the longer axis of the playing field. The game-object movement means then maintains the game-object symbol in a stationary position until coincidence with one of the player symbols, and play action is permitted to continue while the game-object symbol remains stationary.

An operator can operate the manually operable control elements of such a game to move an offensive-player symbol having simulated control of the game-object symbol so as to avoid the defensive-player symbols while putting the offensive-player symbol into position for a "pass" or a "shot." When the symbol is in such a position, the operator can then operate a manually operable control element to cause a simulated shot at the goal position.

In one of the illustrated embodiments, the coincidence-detection means detects coincidence of the game-object symbol with at least one predetermined stationary position on the playing field during independent motion of the game-object symbol. Upon such detection, the game-object movement means initiates movement of the game-object symbol through a second predetermined number of discrete positions. The second predetermined number of discrete positions can be different from the first predetermined number of discrete positions.

BRIEF DESCRIPTION OF THE DRAWINGS

These and further features of the present invention are described in connection with the accompanying drawings, in which:

FIG. 2 is an end view of the device of FIG. 1 showing its central cartridge removed;

FIG. 3 is another end view, partly broken away, showing the cartridge in place;

DETAILED DESCRIPTION OF THE PREFERRED EMBODIMENT

Figure 1:
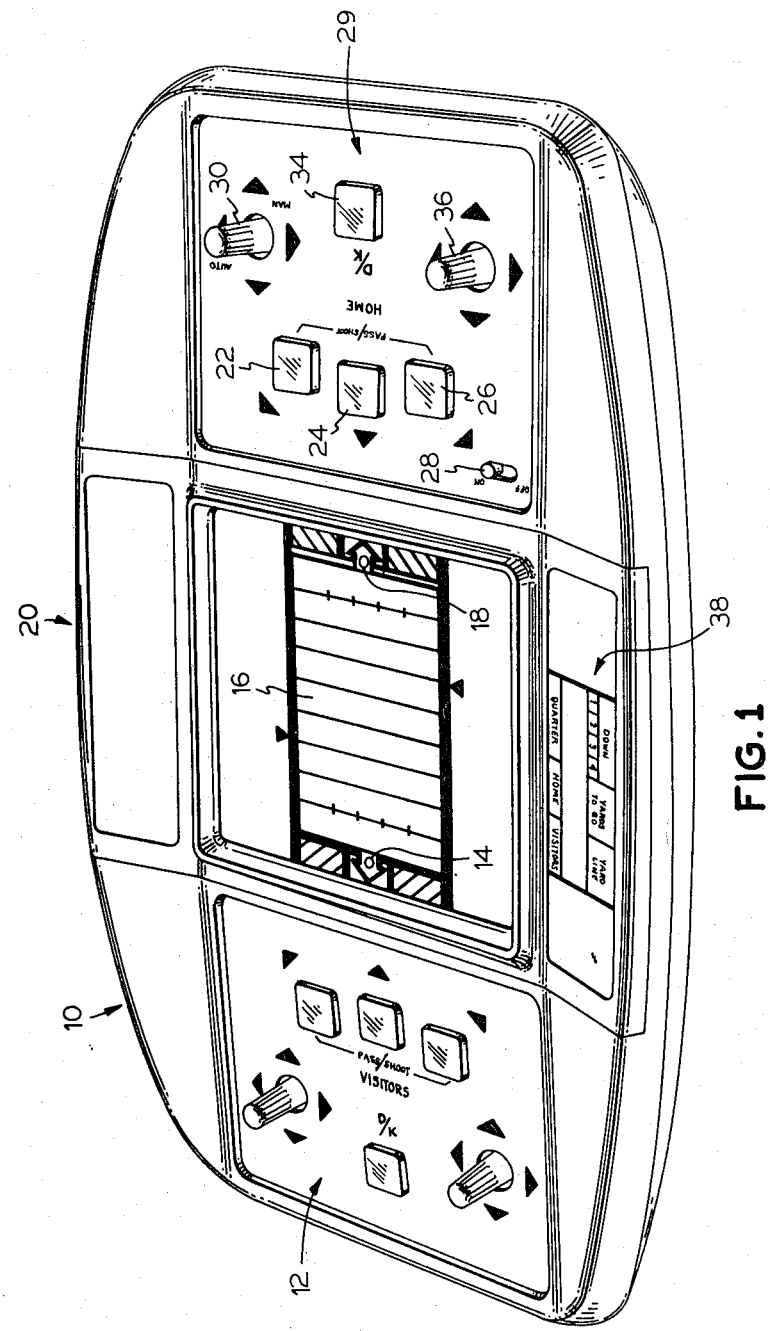
FIG. 1 is perspective view of a game device used to simulate the games of football, basketball, hockey, and soccer.
Figure 4:
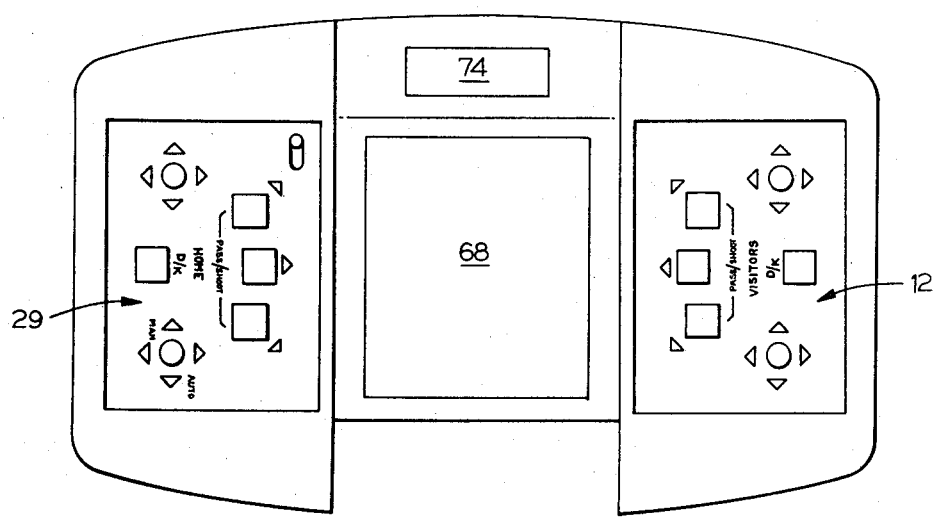
FIG. 4 is a plan view of the device with a cartridge removed.

The drawings illustrate an electronic game in which there are provided two switch assemblies, evidenced in FIG. 1 by levers 30 and 36, that are used to independently and simultaneously control player symbols on the same team. As embodied in FIG. 1, the device is employed to simulate American football, but FIGS. 2–4 illustrate that a central cartridge portion can be removed and replaced with those of FIGS. 11–13 to allow other games to be played. In the football version it is possible by operating right-hand lever 30 to move three of the four offensive play symbols concurrently, but each lever only controls one player symbol at a time in the three games described below.

A more detailed inspection of FIG. 1 reveals that the game 10 includes an elongated housing having opposing control panels 12 and 29 at the two ends. A simulated playing field 16 and a scoreboard 38 are provided between the ends, the play action and status information being conveyed by light-emitting diodes that are common to all versions of the game. Overlying the light-emitting diodes is a cartridge 20 that fits on the housing between the ends and provides the simulated playing field and scoreboard legends peculiar to the game to be played.

The home control panel includes three pass/shoot switches 22, 24, and 26 whose operations cause right diagonal, straight forward, and left diagonal passes, respectively. These keys are also used at the beginning of a play to set up the initial formations of the symbols.

Two levers 30 and 36 are provided to direct the movements of the play symbols that are controlled by the operator. Each lever can be used to selectively operate one of four switches that are described below in connection with FIG. 9. Movement of the lever forward causes one step of the controlled symbol in the forward direction. A single operation of the lever results in only a single step of movement, so repeated operations in a given direction are necessary to cause a symbol to move more than one step in that direction. The lever can also be moved backward, left, and right in order to direct one step of movement backward, left, and right. When the home team is on offense, levers 30 and 36 are manipulated to control the offensive players while the corresponding levers on the visitors' control panel are employed to control the defensive players. When a turnover occurs, the functions performed by the levers are reversed.

Between levers 30 and 36 there is provided a key 34 labeled "D/K" for operating the display of the various status information. In the football version, key 34 is also used to cause simulation of a kick. Finally, an on/off switch 28 is provided to apply power to the unit. The visitors' control panel is similar to the home control panel, but it does not include an on/off switch.

As was noted above, the apparatus can be employed to simulate more than one game. Cartridge 20 is removable from the main body of the game, as FIGS. 2–4 illustrate. In order to change the game to be simulated, cartridge 20 is removed and replaced with a cartridge that is similar in shape but has different playing-field and scoreboard markings. As FIGS. 2 and 4 show, the main body of the game contains a main printed-circuit board 60 mounted horizontally inside it, and the LED matrix is provided on a board 70 that is supported on the printed-circuit board and electrically connected to it.

Board 70 provides two indicator LEDs at its opposite ends and a five-by-nine matrix of LEDs between them. The positions of the indicator LEDs are designated in FIG. 1 by reference numerals 14 and 18. These indicator LEDs are lighted to indicate that a score has occurred in the three games below. In the football version they are lighted to tell the operators on which half of the playing field the ball is positioned; the scoreboard may indicate that the ball is on, say, the thirty-yard line, and the indicator LEDs would tell whether it is the home or the visitors' thirty-yard line.

There is also mounted in the right-hand portion of the main housing as viewed in FIG. 2 a further LED board 76 that contains the LEDs for the scoreboard. It is electrically connected to the main printed-circuit board 60 by a twelve-wire connector 78. Board 76 contains four seven-segment red-LED digits as well as four single green LEDs. The red-LED digits convey the score and, in the football version, the field position. The green LEDs represent the game period and, in the football version, the down number and the game period.

For appearance purposes, two tinted acrylic filters 68 and 74 are provided on the upper surface of the main housing. Filter 68 covers LED board 70, while filter 74 covers LED board 76. With these filters, only the energized LEDs, and not the surrounding circuitry, are visible.

The cartridge, which is seen removed from the main housing in FIG. 2, includes an upper, generally flat portion 50 and a more compact lower portion 48 that depends from the left end of upper portion 50. A scoreboard overlay 54 is inserted in the right-hand portion of the cartridge. This overlay is a clear vinyl sheet with scoreboard legends scribed on it that are applicable to American football. Another clear-acrylic overlay 44 is provided with various indicia that are characteristic of a field on which American football is played. When the cartridge is in place, overlay 54 is disposed in registration with filter 74 and board 76, while overlay 44 is disposed in registration with filter 68 and board 70.

Lower portion 48 of the cartridge has a printed-circuit board 46 mounted in it and extending to the right, while upper cartridge portion 50 provides a mounting finger 58 that extends to the right. When the cartridge is inserted into the main housing, mounting finger 58 is received in an opening 72 in the right-hand portion of the main housing, while printed-circuit board 46 is received in an opening 64 in the left wall of the housing. When printed-circuit board 46 is so inserted, it engages resilient contact fingers 62 that are part of a connector assembly mounted at the left end of main printed-circuit board 60. The contact assembly includes a flange portion 66 that is disposed above contacts 62 and engages the upper surface of printed-circuit board 46 to provide a snug fit and thereby insure proper electrical connection between printed-circuit board 46 and contacts 62. Printed-circuit board 46 is configured differently for different games, and the circuitry or main printed-circuit board 60 determines which game to simulate by interrogating printed-circuit board 46.

Although the game is sized to permit it to be played while being held in the operator's hand, it is customarily played while the housing is resting on a horizontal surface. Accordingly, it may be desirable to provide appropriate feet, such as those designated by reference numeral 80 in FIG. 3, to provide stability and prevent furniture from being marred unnecessarily.

Figure 5A:
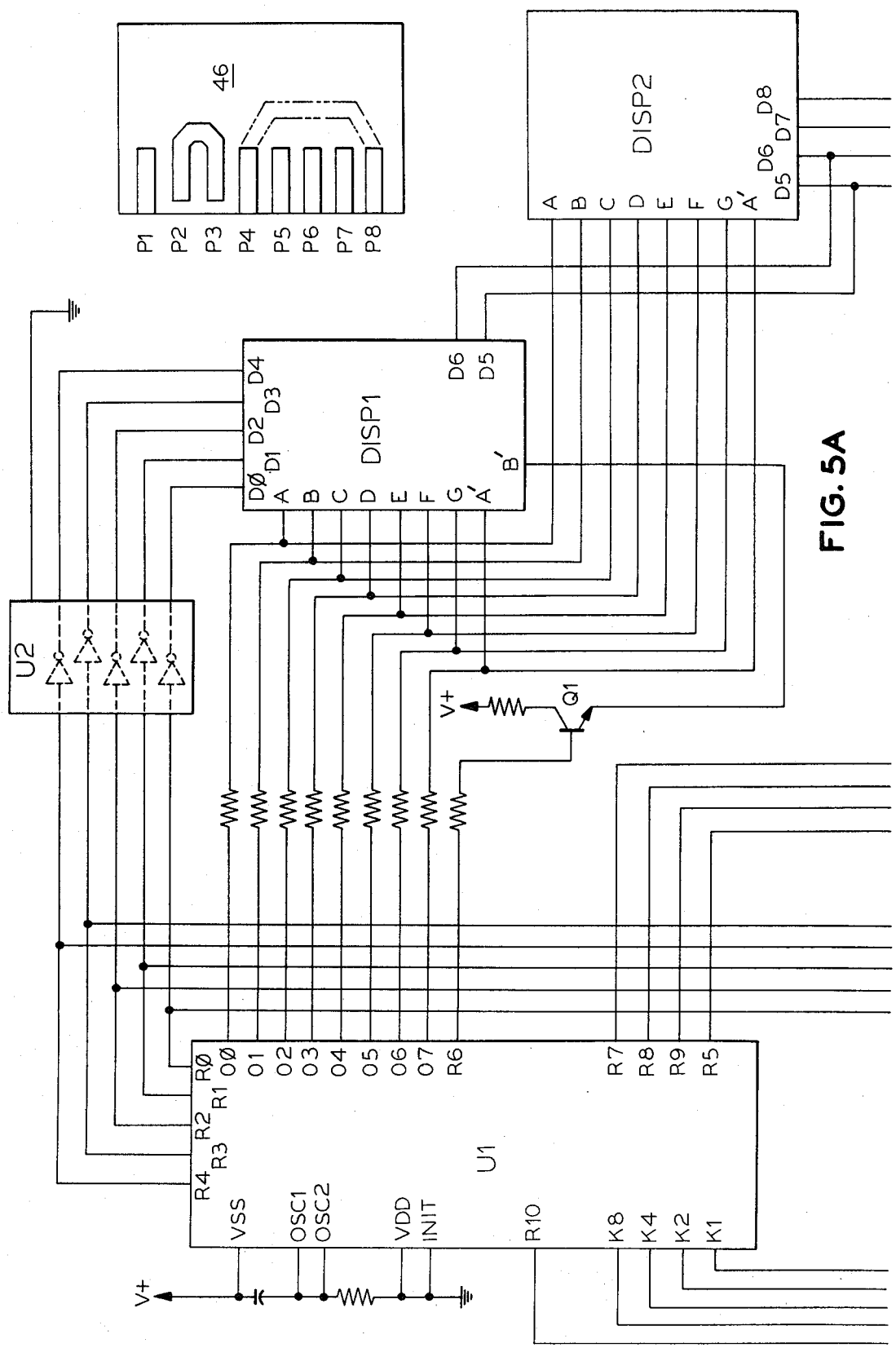
FIGS. 5A and 5B constitute a schematic diagram of the circuitry employed to provide the game action of the device.
Figure 5B:
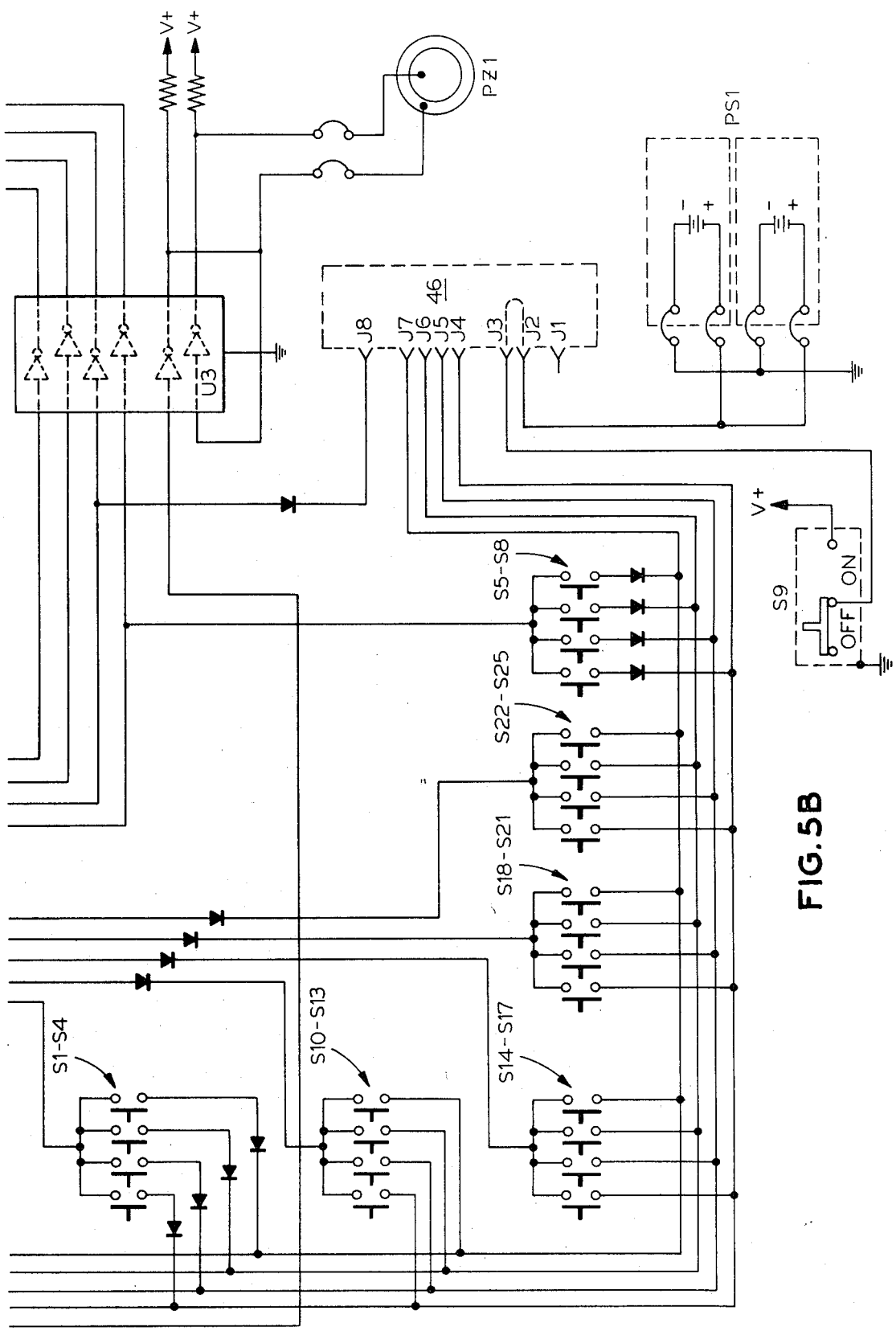

The operational circuitry provided in the game is illustrated in FIGS. 5A and 5B. FIG. 5B is a continuation of FIG. 5A, and the circuit lines extending to the bottom of FIG. 5A are continued at the top of FIG. 5B at the same location. The circuitry will not be described in great detail; those skilled in the art will recognize the individual elements and appreciate their purposes. The following somewhat abbreviated discussion is therefore considered adequate.

The heart of the circuit is a microprocessor U1. In this case, U1 is a Texas Instruments TMS 1400. As will be recognized by those skilled in the art, the microprocessor is programmed by providing read-only memory in U1 according to the requirements of the game manufacturer. The read-only memory contains the programming necessary to provide the features described further on in this specification. It is also programmed to provide a football game.

The circuit also includes the usual power supply PS1, which in this case consists of two nine-volt batteries connected in parallel to supply power to the various circuit elements, including U1. U1 communicates with the other circuit elements by various input/output terminals that are labeled in FIG. 5A in the customary manner. Those skilled in the art will recognize that the choice of terminals for connection to various of the other circuit elements is to a large extent a matter of choice. Of course, once the connections have been decided upon and the ROM has been programmed, the connections cannot be changed without reprogramming.

Communication with the control panels is provided in the illustrated embodiment by terminals R0–R5 and K1, K2, K4, and K8. These terminals are connected to switches S1–S8 and S10–S25. Switches S1–S4 are the keys on one of the control panels, while switches S5–S8 are the keys on the other control panel. It can be seen that these two sets of four switches are connected to a common data bus that in turn is connected to U1 terminals K1, K2, K4, and K8. The difference between the two sets of switches is that switches S1–S4 are interrogated by U1 terminal R0, while switches S5–S8 are interrogated by terminal R5.

The four other groups of four switches, which also are connected to the common data bus, are operated by direction levers such as levers 30 and 36. Each lever controls its own set of four switches; for instance, switches S10–S13 are all controlled by a common lever and are all interrogated by terminal R2. When a lever is operated in the forward direction, one of its associated switches is closed, and the rest of the four associated with it remain open. Operation in each of the other three directions results in closure of a switch associated with that direction. The other sets of four switches operate similarly under control of levers associated with the sets.

In short, therefore, the keyboard switches (with the exception of the on/off switch) communicate with U1 on a common four-line bus, each set of four switches having its own interrogating terminal on the microprocessor.

Microprocessor U1 is programmed to enable it to provide football, basketball, soccer, and hockey. It determines which of theses games to simulate by interrogating printed-circuit board 46, whose circuit paths are illustrated in FIG. 5A. The specific arrangement of the circuit paths is only exemplary, because the specific connections depend on which game is to be played. The phantom lines in FIG. 5A represent the proper connection for football; if the microprocessor senses that P4 is connected to P8, it simulates football. Connection of P8 to P5, P6, or P7 would cause simulation of hockey, soccer, or basketball, respectively.

The connection of printed-circuit board 46 to microprocessor U1 is depicted in FIG. 5B, where connector terminals J1-J8 represent the contacts (contacts 62 in FIGS. 2 and 3) that engage printed-circuit terminals P1-P8, respectively. It is thus seen that interrogation of the printed-circuit board that determines which game is to be simulated is initiated by terminal R9, and the information is forwarded along the common bus employed by the control-board switches. It can also be seen in FIG. 5B that the game is inoperative if the cartridge is removed, because printed-circuit board 46 connects the power source to on/off switch S9 (switch 28 of FIG. 1).

Microprocessor U1 also communicates with the playing field and the scoreboard. The playing-field LEDs are provided on DISP1, the schematic representation of the circuitry on board 70 of FIG. 2. DISP1 provides forty-five red LEDs along x- and y-axes to provide a matrix of five rows and nine columns. As was mentioned above, it also provides the two further LEDs, one at point 14 in FIG. 1, the other at point 18. A given LED is driven by causing current to flow between a pair of DISP1 terminals associated with it. Each of the terminals D0-D4 on DISP1 is associated with a separate row of the red-LED matrix, while each of terminals A', B', and A-D is associated with a separate column. The two indicator LEDs are associated with terminal B' and one or the other of D5 and D6.

In order to keep a full roster of player symbols on the display, it is necessary to multiplex the display in a conventional manner. An exemplary multiplexing scheme is described, for instance, in U.S. patent application Ser. No. 919,860, filed on June 28, 1978, by Eric Bromley for an "Electric Simulated Football Game and Method." The Bromley application is hereby incorporated by reference.

Those skilled in the art will recognize that current amplification is needed in order for some of the terminals to drive the LEDs. For this purpose, transistor Q1 and inverter chip U2 are interposed at appropriate places in the lines between microprocessor U1 and DISP1.

As was mentioned before, the scoreboard display is provided by four seven-segment red-LED digits and four single green LEDs. These are provided by DISP2, which is the schematic representation of the circuitry on board 76 of FIG. 2. Selection of a given digit or green dot is accomplished by selection of one of the terminals D5-D8, while selection of the digit segment is accomplished by selection of one or more of terminals A-G of DISP1. Terminal A' of DISP2 is the common terminal for the four green LEDs. Current amplification is provided by inverter chip U3.

As is conventional in games of this type, sound effects are provided during play-action simulation. Microprocessor U1 provides the sound effects by impressing an appropriate signal on its terminal R10. This signal and its complement are provided at two of the output terminals of U3 and are used to drive a piezoelectric transducer PZ1.

Figure 6:
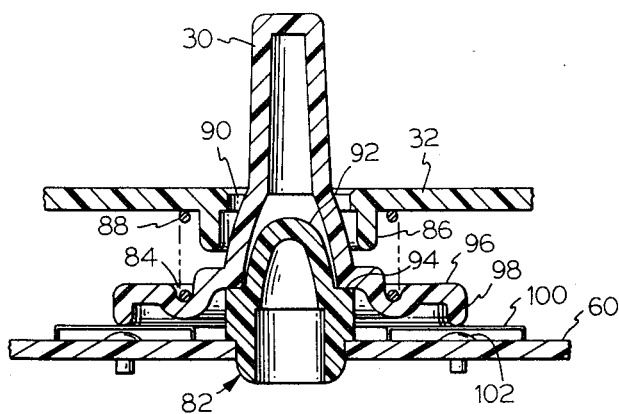
FIG. 6 is a cross-sectional view of a switch assembly employed in controlling the positions of the player symbols.

It was noted above that the four sets of four switches are operated by manipulation of the four direction levers on the control panels. The switch assembly by which this is accomplished is shown in FIGS. 6-9. FIG. 6 shows the upper plate 32 of control panel 29. Plate 32 provides a circular opening 90 through which lever 30 extends. Below plate 32, lever 30 widens into a disc portion 96 by which it rests on a base member 82. Base member 82 includes a boss portion 92 that extends into the interior of hollow lever 30. Around the bottom of boss portion 92 is provided an annular shoulder 94 that supports disc portion 96 of lever 30. A downwardly extending annular flange 86 is provided by plate 32 around opening 90. This flange acts as a positioner that extends axially inside a coil spring 88, which is compressed between plate 32 and an annular recess 84 in the upper surface of disc portion 96 of lever 30. Spring 88 accordingly biases lever 30 to the position shown in FIG. 6.

Figure 8:
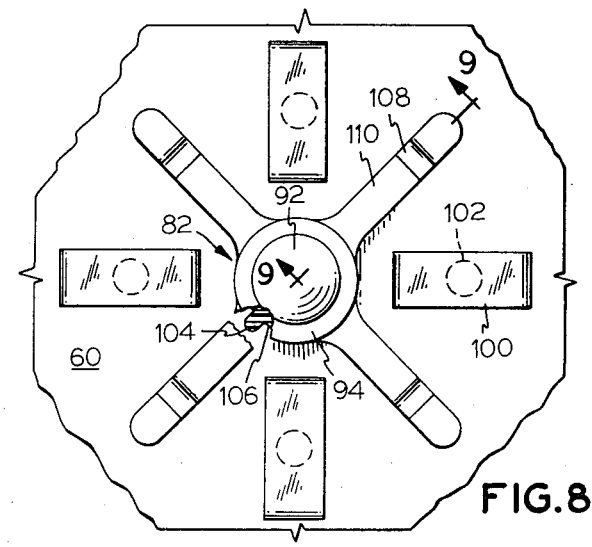
FIG. 8 is a plan view of the switch assembly with parts removed.

Base member 82 is secured in an opening in main printed-circuit board 60 between four equiangularly disposed switches evidenced in FIG. 8 by upper contact members 100. FIG. 6 illustrates that the rectangular upper contact members 100 are disposed above eyelet contacts 102 provided in circuit board 60 and spaced slightly above them. An annular flange 98 is provided on the disc portion 96 of lever 30 and just touches each upper contact 100. Contacts 100 and 102 and similar pairs of contacts constitute the switches identified in FIG. 5B as S10-S25.

Figure 7:
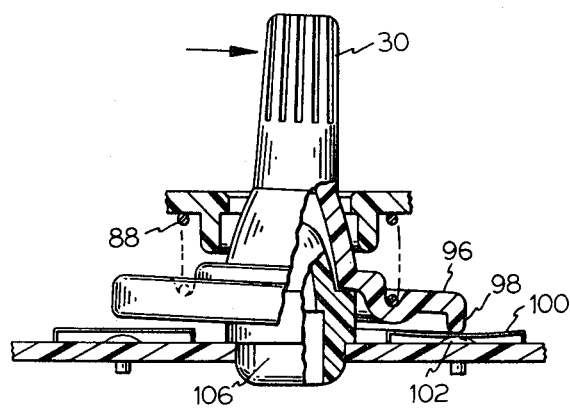
FIG. 7 is a view similar to FIG. 6 but only partly broken away, showing the switch lever in a tilted position.

As FIG. 7 shows, when the operator tilts lever 30 in one of the four directions, disc portion 96 is also tilted, causing flange 98 to urge one of the contacts 100 against its associated contact 102 to close the switch. It will be appreciated that spring 88, in addition to biasing lever 30 to its neutral position, also provides the force that closes the switch when lever 30 is tilted.

Figure 9:
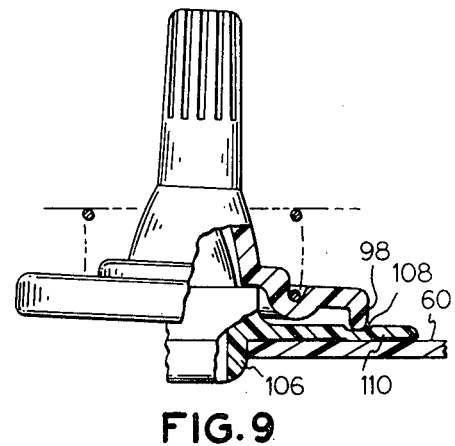
FIG. 9 is an elevational view of the switch assembly partly broken away at line 9—9 of FIG. 8.

In order to prevent operation of two switches at a time, base member 82 is provided with four arms 110, each of which extends between a pair of adjacent switches. Each arm 110 is provided with a recess 108 at the radial position of annular flange 98, as FIG. 9 illustrates. In order to operate two of the switches, the portions of annular flange 98 engaging both switches would have to be at approximately the same distance above printed-circuit board 60, and a portion of annular flange 98 between those two points would have to be even lower. Since the intermediate portion is prevented by arm 110 from descending by the requisite amount, simultaneous operation of the two adjacent switches is prevented.

A tab 104 extending down into a complementary recess in printed-circuit board 60 extends outward from surface 106 of base 82 to key base 82 in the proper angular position.

It should be noted that the switch illustrated in FIGS. 6-9 is particularly advantageous in a game of this type, in which two levers are provided on each side so that an operator can control two independently movable play symbols simultaneously. In previous games, several keys have usually been provided, one key for each direction of movement. Therefore, in order to control one play symbol or a concurrently moving group of play symbols, it was necessary to provide a number of keys equal to the number of possible directions in which the play symbols might be guided. Thus, although it is conceivable for an operator to have learned to direct his play symbols by touch, it more frequently occurred that it was necessary for the operator to take his eyes off the play symbols at least occasionally in order to locate the proper direction key. When such glances were avoided, the operator often operated the wrong key. Other games have used a single cruciform operating element for directing the play symbols. This was only a slight improvement over the multiple-key arrangement because it was still necessary for the operator to move his fingers among the arms of the element in order to direct his play symbols.

With the arrangement illustrated in FIGS. 6–9, the operator can keep his fingers on the same position on lever 30 at all times, and it is never necessary for him to move his fingers relative to lever 30. It will be appreciated that this feature is particularly advantageous if two independently movable play symbols are to be controlled, because time spent in positioning the fingers would doubly detract from the operator's concentration on the playing field in such a situation.

Figure 10:
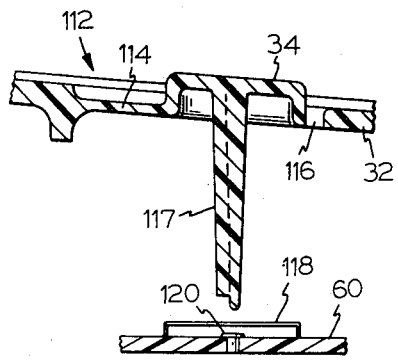
FIG. 10 is a cross-sectional view of one of the keys on the control boards and its associated switch.

It has been found convenient to provide the switches operated by keys 22, 24, 26, and 34 with contacts similar to those provided on the switches operated by lever 30. FIG. 10 illustrates such a switch. Upper plate 32 of control panel 29 is provided with an L-shaped opening 116 that defines an elongated arm 112 having a relieved portion 114 that extends to a raised portion that acts as key 34. Arm 112 is relieved at 114 to make it easily deflectable. Thus, an operator can depress key 34, thereby causing a finger 117 depending from key 34 to operate the switch provided by contacts 118 and 120.

Figure 11:
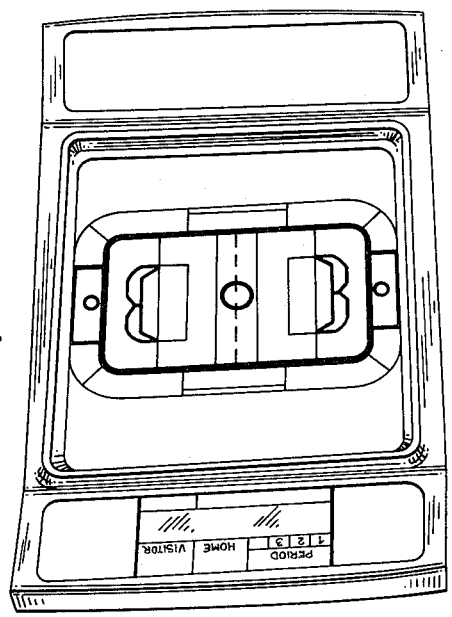
FIG. 11 is a perspective view of a game cartridge used for simulation of ice hockey.
Figure 12:
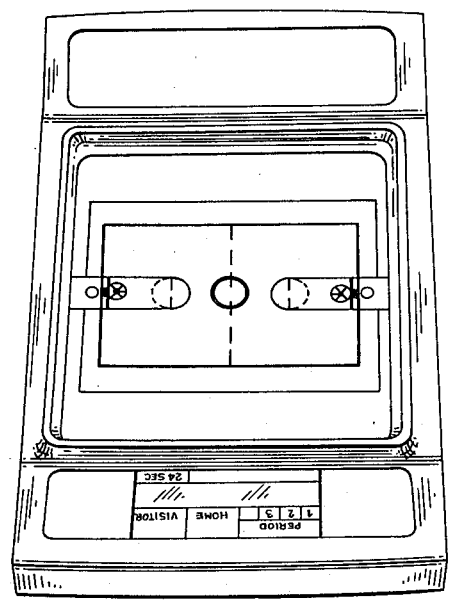
FIG. 12 is a perspective view of a game cartridge used for simulation of basketball.
Figure 13:
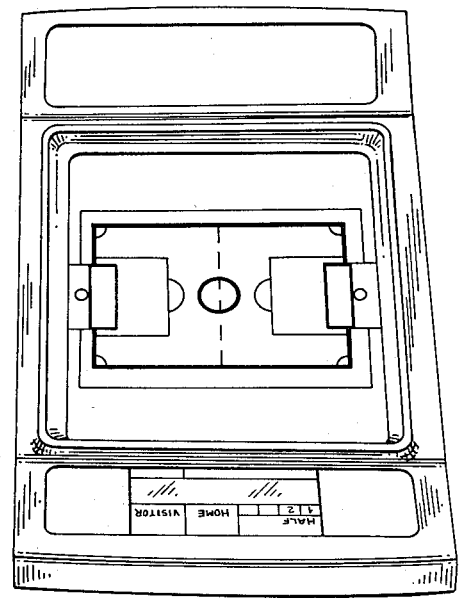
FIG. 13 is a perspective view of a game cartridge used for simulation of soccer.

As was mentioned before, the game that is simulated depends upon the circuit board contained in the inserted cartridge. FIGS. 11, 12, and 13 depict cartridges to be used in simulating hockey, basketball, and soccer, respectively. As can be seen in the drawings, each cartridge includes an overlay similar to overlay 44 of FIG. 2 that contains markings suggestive of the field on which the game is to be played. Also included in each is an overlay similar to overlay 74 of FIG. 2 positioned for registration with board 76 (FIG. 2), which contains the status-display LEDs. As a review of FIGS. 11–13 reveals, these overlays are fairly similar, each indicating which LEDs represent the game period and which represent the home and visitors' scores. It will be seen that the hockey cartridge provides markings for three periods, the basketball cartridge provides markings for four, and the soccer cartridge provides markings for two.

Figure 14:
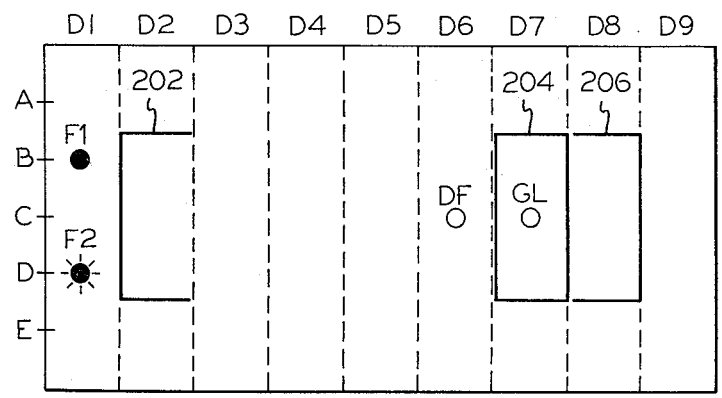
FIGS. 14–20 are diagrams used to explain the play action of the ice-hockey version of the game.

When the hockey cartridge is inserted and the game is turned on, the player-symbol arrangement of FIG. 14 is displayed. FIG. 14 also includes symbols 202, 204, and 206 that are not provided in the device itself but are provided in FIG. 14 to aid the description. The U-shaped symbols 202 and 206 represent opposing goal positions into which the visiting and home teams, respectively, attempt to shoot. Throughout this description, goal 206 will be described as being associated with the home team, while goal 202 will be described as being associated with the visiting team. This nomenclature is being adopted for convenience, although it is somewhat at variance with the parlance typically employed in connection with the real-world games simulated by the electronic device.

Symbols F1 and F2 are shown as solid dots to indicate that they are represented by bright LEDs. They represent the offensive players and are controlled by the left-hand and right-hand control levers, respectively, of the team on offense, which is the home team during the first play. If the device is set for two-player operation, the defensive-player symbols DF and GL, which are represented by open circles to indicate that they are simulated by dimmer LEDs, are controlled by the right-hand and left-hand control levers, respectively, on the control panel for the defensive team. Operation of a control lever forward, backward, left, or right directs the associated symbol to move one position in the indicated direction. However, not all moves are permitted to all of the symbols, and some directed moves accordingly are not effected by the microprocessor.

Among the moves that are not permitted to the player symbols are moves beyond the boundary positions; i.e., the player symbols always remain on the simulated rink, even if they are directed by the operators to move off it. Other forbidden moves are those to positions in goal areas 202 and 206. Each goal area consists of three positions, goal area 202 consisting of the LEDs of rows B, C, and D in column D2. Goal 206 comprises the corresponding LEDs in column D8. If a player symbol is directed to move to any of these positions, it remains stationary until the next permitted move is directed.

With the exception of goalie symbol GL, all of the player symbols are also prohibited from occupying the "crease" represented by block 204. The crease consists of the three positions immediately in front of the goal associated with the team on offense, so it is represented in FIG. 14 as being in column D7. When the visitors are on offense, the crease consists of the corresponding three LEDs in column D3.

The other restrictions imposed upon the player symbols by the microprocessor are that goalie symbol GL is restricted to column D7 (D3 if the visitors are on offensene) and that no player symbol can move to the position of another player symbol unless that position is also occupied by the puck-position symbol.

Offensive-player symbol F2 is further distinguished in FIG. 14 to indicate that it blinks to represent the position of the puck. It is the object of the game for the team on offense to shoot the puck into the goal area associated with it and thereby score, while the team on defense attempts to cause the defensive-player symbols to coincide with the puck-position symbol and thereby cause a turnover. When a turnover occurs, action stops, and the score and period are displayed. The operator previously on defense then operates the D/K key, and the player symbols are realigned in the positions opposite those in FIG. 14. In other words, symbols F1 and F2 are displayed in rows D and B, respectively, of column D9, while symbols DF and GL are displayed in columns D3 and D2, respectively, of row C. Such a realignment occurs whenever a turnover is forced by the coincidence of the puck-position symbol and a defensive player. It also occurs when a goal is scored or when the team on offense has failed to score within fourteen "ticks." (While the puck is in play, a ticking sound is produced to indicate the passage of time, a tick occurring approximately once every 1.4 seconds.)

An exemplary play is illustrated in FIGS. 15–19. Operation of his right-hand lever once to the right and then once forward by the home-team operator moves offensive-player symbol F2 to the position shown in FIG. 15. It was necessary for F2 to be moved to the right before being moved forward because an initial forward move would have landed F2 in one of the goal positions, and the device would therefore not have effected such a move if it had been directed. At the same time as he is moving symbol F2 with his right-hand lever, the home-team operator moves F1 by three steps with his left-hand lever. The visiting-team operator, noting the movement of F2, which also is the puck-position symbol, moves DF two steps to his left by two leftward operations of his right-hand lever.

At this point, the offensive operator orders a left-diagonal pass by depressing pass key 26. This changes the simulation of the puck from the control mode, in which it moved with a player symbol, to an independent mode, in which it moves separately. The separate puck-position symbol moves four positions in a straight-line diagonal path, ending up in row A of column D6. There it remains stationary and blinks, while player symbol F2, which now does not control the puck, no longer blinks.

Figure 15:
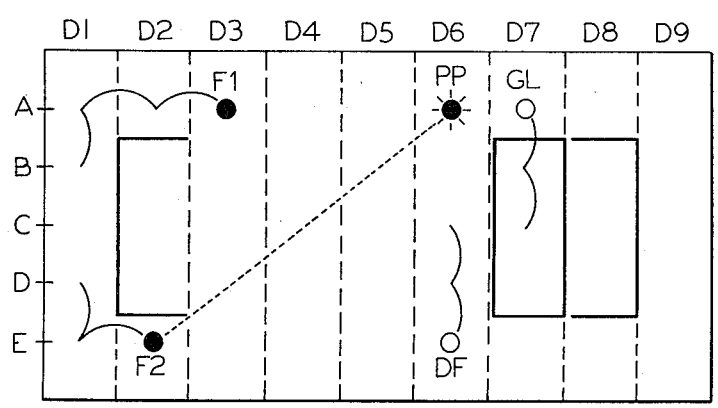

Puck-position symbol PP stops at the position shown in FIG. 15 because it has moved by four positions, not because it has reached a boundary position. The microprocessor is so programmed that a pass ordinarily only results in movement by four positions. At the fourth position, the puck is simulated as being stationary in control of no player, and play continues with the puck in the stationary position until a player symbol reaches it or the time permitted for one play runs out.

In the example illustrated in FIG. 15, the visiting-team operator notices the position of puck-position symbol PP and operates his left-hand control lever to move GL two positions to the right. Since GL is restricted to column D7, however, the visiting-team operator cannot advance GL to the position of PP to effect a turnover.

Figure 16:
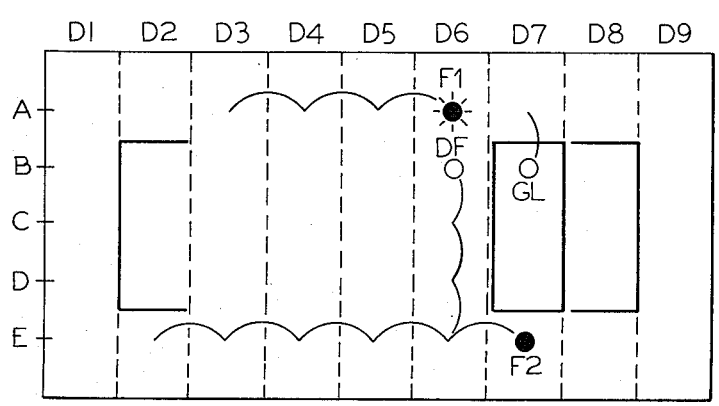

FIG. 16 illustrates a scramble of players F1 and DF toward puck-position symbol PP. At the stage illustrated in FIG. 16, F1 has arrived first, and it begins blinking to indicate that it is now in control of the puck. At the same time as he moves F1 forward, the home-team operator also moves F2 forward, and F2 reaches column D7. Seeing that F1 is now in position to score a goal upon depression of the home-team operator's right-diagonal-pass switch, the visiting-team operator moves goalie symbol GL one space to his left, thereby locking the path to the goal.

Figure 17:
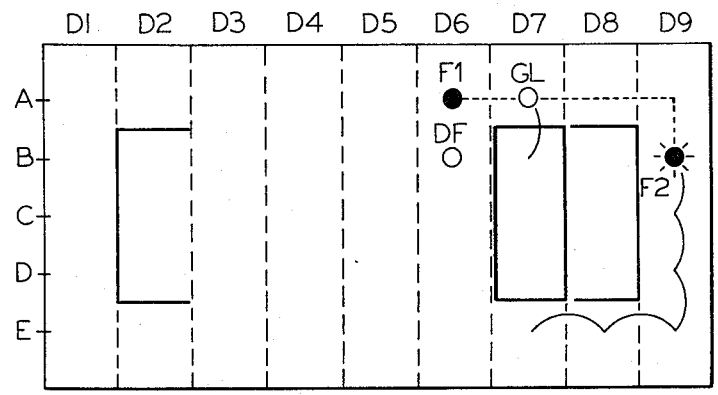

FIG. 17 illustrates further action. Realizing that a turnover would be effected if DF were to reach F1, the home-team operator depresses his straight-ahead-pass key 24, causing a pass of the puck-position symbol along row A. However, there are only three steps that the puck-position symbol can take along row A, and the microprocessor accordingly causes it to turn the corner to take one step along column D9. This is the general response when the puck encounters a boundary during its independent mode of simulation; it "hugs" the boundary. In the example in FIG. 17, the puck started out along one boundary, encountered another boundary, and "hugged" the boundary to finish out its four steps. The same thing occurs when a pass begins in the interior of the rink. In the example of FIG. 15, for instance, if the pass had begun in row C of column D4, the boundary line, row A, would have been encountered on the second step. Accordingly, PP would have continued along row A ("hugging" the boundary) to finish out its four steps at column D8 of row A.

In the example of FIG. 17, the puck-position symbol stops in row B of column D9, and the visiting-team operator moves GL to row A to prevent F1 from reaching the ball-position symbol. In the excitement of the moment, the visiting-team operator forgets the constraints imposed by F1 and the "crease," and he operates his right-hand lever several times in an attempt to follow the puck-position symbol. Since DF is prevented from moving into the position of F1 or that of the crease, however, DF does not move. But offensive-player symbol F2 does move, reaching the puck-position symbol at the stage illustrated in FIG. 17. Accordingly, F2 begins to blink.

Figure 18:
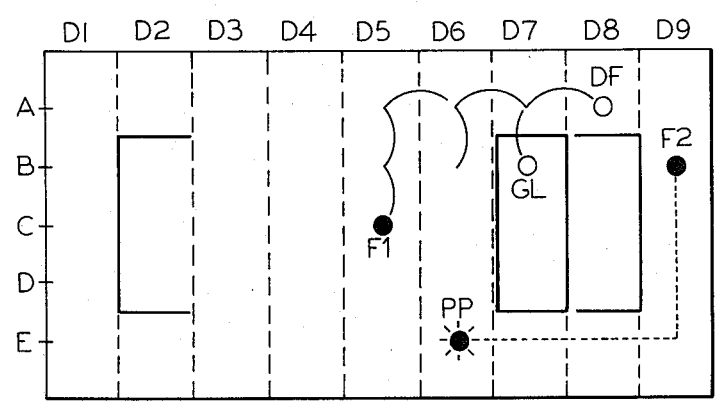

In FIG. 18, F1 is shown to move out of the way of DF, and DF accordingly is moved by the visiting-team operator into and along row A to try to reach F2 and thus the puck-position symbol. In order to allow this movement along row A, the visiting-team operator also moves goalie GL out of the way of DF. At this point, the offensive operator notes the impending contact with DF, and he accordingly depresses his right-diagonal-pass switch. Of course, a right-diagonal pass is not possible from the position of F2 in FIG. 18, but a pass is nonetheless effected because the puck-position symbol is in a boundary position, and the microprocessor accordingly causes it to hug the boundry.

In its first step, PP encounters the central LED behind the goal. This is a special position on the rink because, when the microprocessor detects coincidence between the puck-position symbol and this central position behind the goal during independent-mode puck simulation, the pass terminates, but puck movement continues because a routine is entered that delivers the puck position symbol along the boundary to a position on the boundary in column D6 (D4 when the visitors are on offense).

This behavior of the puck-position symbol was not encountered in FIG. 17 because the symbol failed to reach the "booster" position. If the shot in FIG. 17 had originated in column D7, on the other hand, the "booster" position would have been reached on the fourth step, and the puck-position symbol would have ended up in row E of column D6.

It should be noted that the "booster" position also operates in the other direction; a shot from row E of column D7 would end up in row A of column D6.

Further booster positions could be provided, of course. Also, it might be desirable in some instances that the amount of "boost" be dependent on the position from which the booster is approached. The amount of "boost" could even be made random or pseudo-random.

The puck-position symbol then remains stationary and blinking until a player symbol coincides with it. Had the home-team operator depressed his left-diagonal-pass switch, and DF not having been previously moved from Row B, the puck-position symbol would have moved to row A, its four steps ending in column D6 at the position from which it was passed in FIG. 16. Depression of the straight-ahead-pass switch would have resulted in no movement of the puck-position symbol.

Figure 19:
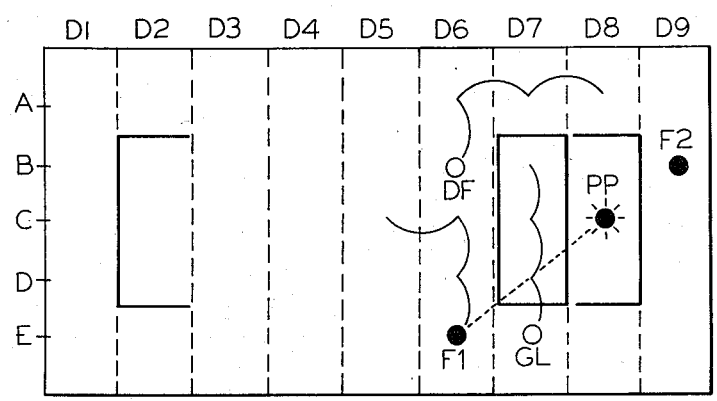

In FIG. 19, DF, GL, and F1 all race to the puck, but F1 reaches it first. Since F1 is now in possession of the puck, the home-team operator can pass it, and he does so by operating left-diagonal-pass switch 26. Unlike the other offensive play symbols, the puck-position symbol is permitted in the "crease," and it passes through it to the goal. The microprocessor detects the coincidence of the puck-position symbol with the goal, records the fact that a goal has been scored, and awards one point to the home team. The indicator LED in position 14 (FIG. 1) is turned on and an appropriate fight song is played both to indicate the occurrence of the goal, and the score and the period are displayed, as they are before each change of possession. This display continues until the visiting-team operator, whose team is next to be on offense, depresses his D/K key, thereby setting up an initial position that is the reverse of FIG. 14. Play then begins again as soon as the first lever operation is made by the visiting-team operator, whose team is now on offense.

No pass completions or interceptions were described in the foregoing series of plays. However, the microprocessor is programmed so as to detect the coincidence of the puck-position symbol with an offensive-player symbol during a pass and signify the resultant reception by causing the receiving offensive player to blink. Detection of the coincidence of the puck-position symbol with a defensive-player symbol results in termination of play and entry into the turnover sequence.

It should also be noted that the special rule for the passing of a puck behind a goal was only described in connection with the goal associated with the team on offense. When a pass is attempted from behind the goal associated with the team on defense, no pass will occur if the puck-position symbol is in row B, C, or D. If the puck-position symbol is behind the goal in row A or E, the puck will move four spaces along the row, regardless of which pass key is depressed.

The game continues with each team being alternately on offense until the end of a period. The duration of a period is counted as a function of play-action time, but it is intended to average about six minutes of real time. The visiting team is on offense at the beginning of the second period, and the home team is again on offense at the beginning of the third period. The team with the most points at the end of the third period wins the game.

It has been assumed in the foregoing description that the device has been set for play by two opposing human operators. The device is set for two-player operation if the right-hand home-team control lever is held in the back or left position as the device is turned on. It is also possible to set the device for one-player operation, in which the human operator plays against the microprocessor, the microprocessor always playing defense. In order to set the device for one-player operation, the right-hand home-team control lever is held in the right or forward position as the device is turned on. If the lever is held in the forward position, the microprocessor moves the defensive-player symbols more slowly than it does when the lever has been held in the right-hand position as the device is turned on. Two-player action results if the control lever is in its rest position when the device is turned on.

The rules for one-player play are substantially the same as those for two-player play, with the exception that the goalie movement differs considerably. The movement of the other defender differs only in that it is computer controlled, keying on the puck-position symbol, but it is allowed to occupy only the same spaces that it can occupy during two-player operation.

The goalie motion is afforded in a manner that will be described in connection with FIG. 20. It is assumed in FIG. 20 that the home team is on offense, but the comments below also apply, *matatis mutandis*, when the visiting team is on offense.

Figure 20:
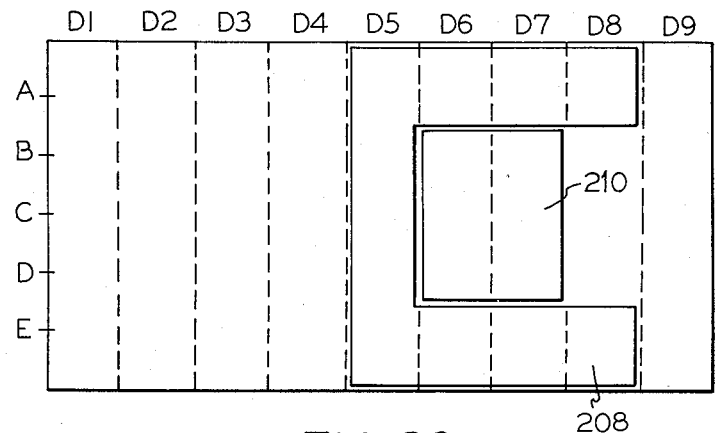

FIG. 20 shows two zones, a three-by-two goalie-movement zone 210 and a C-shaped step-out zone 208. Instead of being restricted to column D7 (D3 when the visitors are on offense), the goalie symbol in the one-player mode is ordinarily restricted to goalie-movement zone 210. The goalie's specific moves within zone 210 are unpredictable to the operator, but the goalie does gravitate toward the row occupied by the puck-position symbol. In addition, the goalie symbol ordinarily moves between columns D6 and D7 in an apparently random manner, occupation of each column being equally likely.

When the puck-position symbol occupies one of the positions in zone 208, the goalie symbol can move to the edge of zone 210, and then "step-out" into zone 208 if the result is coincidence with the puck-position symbol. Thus, the computer-controlled goalie has an advantage that the operator-controlled goalie does not.

The difference between the operation of the goalie during one-player operation and its operation during two-player operation is intended to provide a more challenging defense. During one-player operation, the goalie seeks the row occupied by the puck position symbol; the position of the offensive-player symbol not in control of the puck is not taken into account, and neither is the possibility for diagonal shots or passes. The computer-controlled goalie symbol is thus not as "intelligent" as a human operator, so the different movement patterns during one-player operation are provided as compensation.

Figure 21:
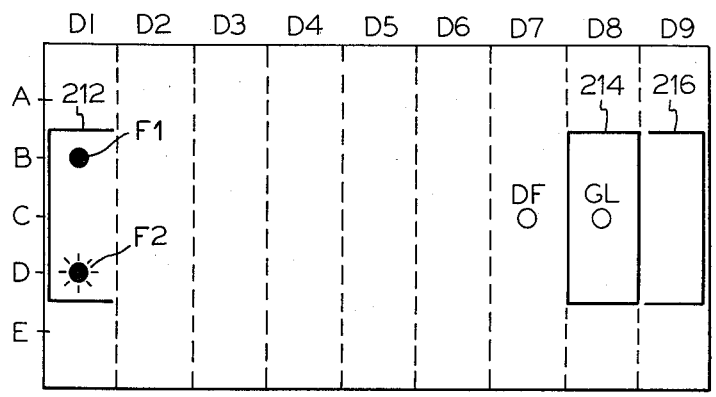
FIG. 21 is a similar diagram illustrating soccer.

If the soccer cartridge is substituted for the hockey cartridge, the player-symbol layout of FIG. 21 is displayed when the device is first turned on. Like the hockey game, the soccer game is begun with the home team on offense, its player symbols F1 and F2 being represented by the more brightly lighted LEDs, F2 blinking to indicate that it is also the ball-position symbol.

FIG. 21 is provided with two C-shaped symbols 212 and 216 at opposite ends to represent opposite goals, and a "crease" symbol 214 is provided in front of goal area 216 to indicate that this region is off limits to all player symbols except the goalie symbol. After a turnover, the "crease" occupies corresponding positions on the opposite side of the field.

It will be noted that the positions of the goals and the crease in the soccer version differ from the goal and crease positions in the hockey version. Specifically, there is no space provided behind the goals. Accordingly, the offensive-player symbols are initially lined up inside of the goal, while the defensive players are lined up one column to the right from their positions in FIG. 14. Although F1, and F2 are initially shown in goal 212, they cannot return to 212 once they have moved out.

No extensive description of the soccer rules will be given here. Because of the differences in goal positions, the special rules in hockey for passes behind the goals are not provided in soccer. With one other exception, though, the hockey and soccer rules are fairly similar. The major exception is that the passes in the soccer game, unlike those in the hockey game, are permitted to go "off the field." In other words, if a pass from between the boundaries encounters a boundary line before the fourth step of the pass, the ball-position symbol disappears from the simulated field instead of continuing the pass by hugging the boundary. When the ball leaves the field, a turnover occurs.

The goalie-movement and step-out regions in the soccer version are, like the goal positions, displaced by one column from their positions in the hockey version.

Like the hockey game, the soccer game takes about eighteen minutes to play in real time, but the soccer game is divided into two periods rather than three, so only two of the green LEDs on board 76 are employed by the soccer version.

Figure 22:
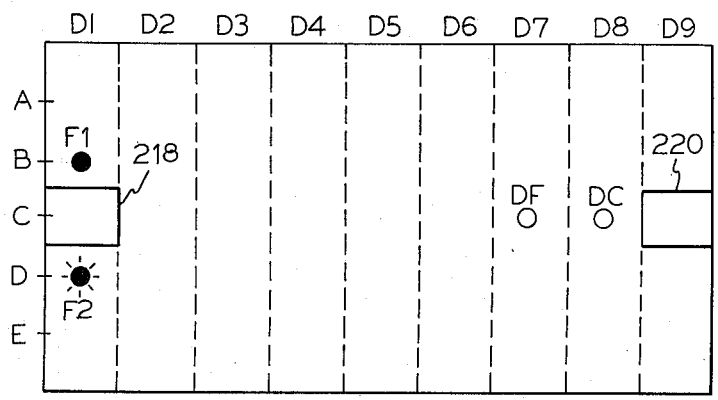
FIGS. 22–26 are similar diagrams used in connection with the description of basketball simulation.

When the basketball cartridge is inserted, the play action is significantly different from that which is provided by the other cartridges. The player-symbol layout of FIG. 22 results when the device is turned on and the basketball cartridge is in place. Again, the home team starts out on offense with two offensive players F1 and F2, F2 being in possession of the ball and therefore blinking. Dimmer LEDs represent the two defensive players DF and DC. Rectangles 218 and 220 at opposite ends of the court in FIG. 22 represent the goals.

Unlike the player symbols in hockey and soccer, the basketball player symbols are permitted to move to any position on the court, including the goal positions, during two-player operation. Control of the player symbols is afforded by manipulation of the control levers in the same manner as such control was provided in hockey and soccer, and passes and shots are effected by manipulating the same keys that were used in the hockey and soccer versions. Like the pass distances in hockey and soccer, pass distances in basketball are limited to four positions, and, like the passes in soccer, the passes in basketball are permitted to leave the court and thereby cause a turnover.

Figure 23:
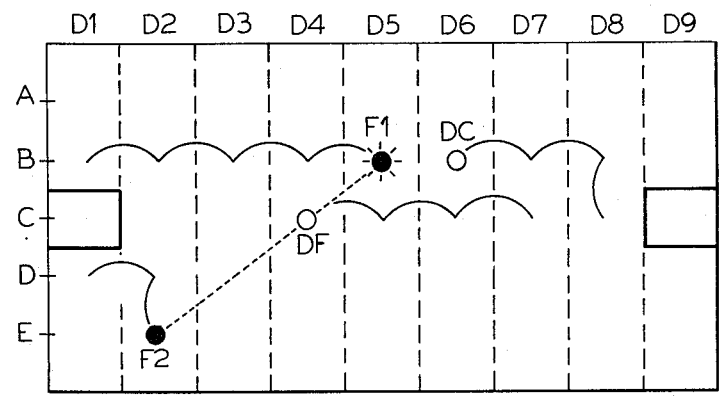

An exemplary play will be described in connection with FIGS. 23–25. FIG. 23 depicts the initial movements of the players of both teams. Offensive-player symbol F1 is quickly moved forward four spaces by four successive forward actuations of the home team's left control lever, and defensive-player symbol DC is moved to cover F1 by three successive actuations of the visiting team's left-hand control lever. The offensive operator employs his right-hand control lever to move F2 one space forward and then one space to the right, while manipulation of the visiting team's right-hand control lever moves DF forward three spaces. At this point, the home team's left-diagonal-pass key is operated to cause a left-diagonal pass from F2 through the position of DF to F1.

It should be noted that coincidence of the ball-position symbol with DF did not result in an interception, although coincidence with offensive-player symbol F1 resulted in a pass completion. This distinguishes the basketball version from the hockey and soccer versions, in which any coincidence with a defensive-player symbol during independent motion of the game-object symbol results in a turnover. It is possible for a defensive-player symbol to intercept a pass in basketball, too, but this only happens if the coincidence occurs at a position adjacent to the passer's position; if DF had been in row D of column D3, an interception would have been simulated by entry into a turnover sequence similar to the turnover sequences in soccer and hockey, and the symbols would subsequently have been set up upon operation of the visiting team's D/K key in positions opposite those illustrated in FIG. 22.

Figure 24:
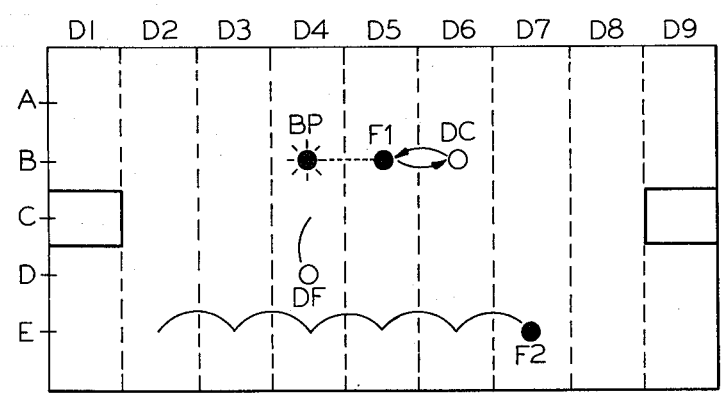

Since DF was not in a position to intercept, however, the pass is completed to F1, and play continues as FIG. 24 suggests. In FIG. 24 it is shown that F2 is moved forward while DF moves sideways in pursuit. At the same time, the visiting-team operator operates his left control lever forward while F1 is still in control of the ball, thereby directing DC to the position of the ball-position symbol. In hockey or soccer, this would have resulted in an immediate turnover, but in basketball it results in a simulation of the ball's being knocked loose. This simulation is achieved by causing the ball-position symbol to occupy a stationary position just behind the offensive-player symbol previously in control of the ball. At the same time, DC is automatically moved by the microprocessor back to the position from which it moved into contact with F1. Accordingly, the play continues with a stationary loose ball at row B of column D4.

The same result would have occurred if DC had moved to the position of F1 from row A or C of column D5; the ball-position symbol would still have ended up in row B of column D4. The ball-position symbol would also have ended up there if DC had moved to the position of F1 from row B of column D4, but a turnover would have occurred in that case because DC, after "bumping into" F1, would automatically have moved back to row B of column D4, the new ball position; when a defensive-player symbol coincides with the stationary ball-position symbol during its independent mode of simulation, a turnover results.

It may be useful at this point to enumerate the ways in which turnovers can occur in the basketball version of the game. As in hockey and soccer, the team on offense in basketball only has about fourteen seconds in which to score before play is stopped, the turnover sequence is entered, and the opposing team obtains control over the ball. A turnover also occurs if the ball is simulated to have left the court or if an interception occurs. During independent-mode simulation of the ball, coincidence between a defensive-player symbol and the ball-position symbol results in a turnover. Finally, the turnover sequence is also entered after a goal is scored.

Figure 25:
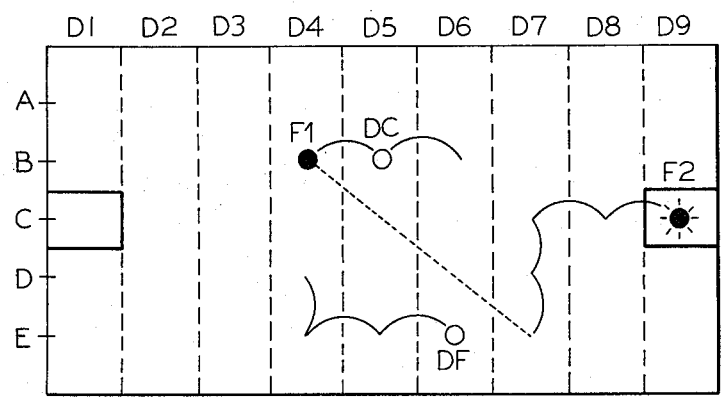

The end of the exemplary play is depicted in FIG. 25, where it is seen that F1 moves to the position of the ball-position symbol, thereby regaining control over it. Defensive-player symbol DC is in hot pursuit, so the offensive operator immediately depresses the right-diagonal-pass key, and the microprocessor causes simulation of a pass to F2, which is pursued by DF. Although F2 has a clear shot at the basket upon reception of the ball, the offensive operator elects to attempt a layup and accordingly maneuvers F2 to the goal position. In the basketball version, it is possible for any player symbol to occupy the goal position, so layup simulation is possible, and F2 makes the layup successfully. Accordingly, two points are scored for the home team, the indicator LED is lighted, and the turnover sequence is entered.

In the turnover sequence, the display blinks the position of the turnover for two seconds while the remaining symbols are removed from the display, and the score and game period are then displayed until the new offensive operator depresses his D/K key to set up the initial positions of the player symbols.

As in soccer and hockey, the total real time in a game of basketball is variable. The typical game lasts approximately twenty-four minutes and is divided into four equal periods, the current period being represented by one of the green LEDs. Possession of the ball at the beginning of each period alternates, the home team having possession at the beginning of the first period.

The preceding play was an example of a play carried out in the two-player mode. Like the hockey and soccer versions, the basketball version can also be played in an one-player mode. The mode and skill level in the basketball version are chosen in the same way that the corresponding mode and skill level are chosen in the hockey and soccer versions.

The rules of player motion, with one exception, are substantially the same in the one-player modes of basketball as they are in its two-player mode; the offensive-player symbols can be moved anywhere on the field, as can defensive-player symbol DS, which, being under control of the computer, moves in an "intelligent" but somewhat unpredictable manner toward the ball-position symbol.

Figure 26:
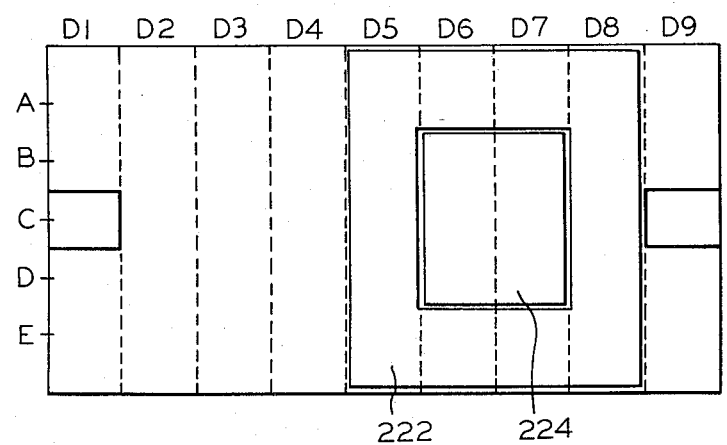

On the other hand, the movement of the defensive-center symbol DC differs in the one-player mode. The movement of the defensive-center symbol in the one-player mode is described in connection with FIG. 26, which depicts a two-by-three center-movement region 224 within which defensive-player symbol DC is ordinarily constrained to remain. It moves within this area in an apparently random manner, gravitating toward the row occupied by the ball-position symbol but occupying the two columns with equal likelihood. However, if the ball-position symbol moves into the area designated in FIG. 26 by reference numeral 222, defensive-player symbol DC can "step out" to coincide with the ball-position symbol. If simulation of the ball is in the control mode, it is "knocked loose" upon coincidence. Otherwise, coincidence causes a turnover.

With the exception of the automatic nature of the defensive-player movements and the specific characteristics of the DC symbol, the one-player mode is the same as the two-player mode.

It will be appreciated that the several versions of the game described above provide features that afford a considerable variety of game action. One feature is the "dead-ball" feature, in which a stationary game-object symbol is displayed independently of the player symbols and play is permitted to continue. This allows both teams to scramble after the ball, and, although coincidence of the defender symbol with the game-object symbol always results in the end of play action in the illustrated embodiments, it is easily seen that this feature has further potential in games in which turnovers are afforded without termination of play action.

Another advantageous feature illustrated above is the behavior of the puck-position symbol in the hockey version. It "hugs" the boundary, thereby creating typical hockey play without the imbalance in offensive strength that could result from a rebound function.

Two functions provided by the basketball version are the "knocking loose" feature and the combination of providing scoring by both layups and shots. These features add to the realism of the game and increase the play possibilities.

Accordingly, it is believed that the several features described in connection with the illustrated embodiment add significantly to the electronic-game art.

Having thus described the invention, I claim:

1. An electronic sports-action game comprising:
    a. a housing;
    b. a display panel on the upper surface of said housing including a visual simulation of a playing field and adapted to display symbols at discrete positions on said playing field between side and end boundary "lines" in response to electrical signals applied thereto, the simulated playing field being of the type on which is played a game between two teams in which each team attempts to maneuver a game object into a goal associated with it and thereby to achieve a score, said display panel simulating a goal associated with one team and located in a goal area that includes at least one of the discrete positions in that end of the playing field defended by the other team, said display panel also simulating a goal associated with the other team and located in a goal area that includes at least one of the discrete positions in that end portion of the playing field defended by the one team;
    c. operational-circuit means disposed in said housing and electrically connected to said display panel for generation and transmission of electrical signals to said display panel to produce symbols on said simulated playing field, said symbols including offensive-player symbols which simulate players of the team currently on offense, defensive-player symbols which simulate players of the team currently on defense, and a game-object symbol which simulates a game object in two modes, a control mode in which the game-object symbol moves with an offensive-player symbol to simulate the game object under control of that simulated offensive player, and an independent mode in which the game-object symbol moves independently of said player symbols, said operational-circuit means including:
        (i) means for moving at least one offensive-player symbol about said playing field and thereby moving said game-object symbol when the game object is simulated to be under the control of the offensive-player symbol being moved;
        (ii) means for moving at least one defensive-player symbol about said playing field;
        (iii) game-object movement means operable to move said game-object symbol independently of said player symbols when simulation of the game object is in said independent mode, said game-object movement means being operable to move said game object in a straight-line path to simulate a "pass" or a "shot" of the game object and being operable to stop said game object symbol after traversing a number of said discrete positions on said playing field;
        (iv) coincidence-detection means for detecting coincidence between said game-object symbol and a goal position during a simulated shot from a player symbol of the team associated with said goal position and thereby detecting a score;
        (v) means for monitoring play action to record information concerning the status of said simulated game and for producing signals indicative of said status information, said signals conveying the recorded information to an operator of the game; and
    d. a control board on said housing including a multiplicity of manually operable control elements electrically connected to said operational-circuit means for transmission of electrical signals thereto through manual operation of said control elements, at least one of said manually operable control elements being operable to transmit signals to said operational-circuit means to produce manually controlled movement of at least one of said offensive-player symbols, at least one of said manually operable control elements being operable to transmit signals to said operational-circuit means for production by said game-object movement means of the straight-line movement of said game-object symbol independent of said player symbols, said straight-line movement being stopped by said game-object movement means upon independent movement through a predetermined number of positions along said straight-line path that is less than the number of discrete positions along the longer axis of the playing field, said game-object movement means then maintaining said game-object symbol in a stationary position until coincidence with one of said player symbols, said operational circuit means permitting play action to continue while said game object is in its stationary position, whereby an operator can operate said manually operable control elements to move an offensive-player symbol having simulated control of said game-object symbol about said simulated playing field to avoid said defensive-player symbols and to put said offensive-player symbol into position for a "pass" or "shot" and then operate a manually operable control element to cause a simulated shot at said goal area.

2. The electronic sports-action game of claim 1 wherein, when said game-object symbol encounters at least one of said boundary lines during independent motion, said game-object movement means diverts said game-object symbol from the straight-line path and continues the independent motion of said game-object symbol along said boundary line.

3. The electronic sports-action game of claim 2 wherein said coincidence-detection means detects coincidence of said game-object symbol with at least one predetermined stationary position on said playing field during independent motion of said game-object symbol and wherein upon such detection said game-object movement means initiates movement of said game-object symbol through a second predetermined number of discrete positions.

4. The electronic sports-action game of claim 3 wherein said second predetermined number of discrete positions is different from said first-mentioned predetermined number of discrete positions.

5. The electronic sports-action game of claim 2 wherein said discrete positions include at least one booster position, wherein said coincidence-detection means detects coincidence of said game-object symbol with said at least one booster position during independent motion of said game-object symbol, and wherein upon such detection said game-object movement means acts to differ the number of positions of independent movement from said predetermined number thereof.

6. The electronic sports-action game of claim 1 wherein said detecting means also detects coincidence between a defensive-player symbol and an offensive-player symbol that has simulated control of the game object and wherein said game-object movement means institutes the independent mode of game-object simulation upon such detection.

7. The electronic sports-action game of claim 1 wherein said detection means also detects coincidence between said game-object symbol and said goal area associated with the team currently on offense while the game object is being simulated in the control mode, a score thereby being possible in both modes of game-object simulation.

8. The electronic sports-action game of claim 7 wherein said detecting means also detects coincidence between said defensive-player symbol and the offensive-player symbol that has simulated control of the game object and wherein said game-object movement means institutes the independent mode of game-object simulation upon such detection.

9. An electronic sports-action game comprising:
 a. a housing;
 b. a display panel on the upper surface of said housing including a visual simulation of a playing field and adapted to display symbols at discrete positions on said playing field between side and end boundary "lines" in response to electrical signals applied thereto, the simulated playing field being of the type on which is played a game between two teams in which each team attempts to maneuver a game object into a goal associated with it and thereby to achieve a score, said display panel simulating a goal associated with one team and located in a goal area that includes at least one of the discrete positions in that end of the playing field defended by the other team, said display panel also simulating another goal associated with the other team and located in a goal area that includes at least one of the discrete positions in that end of the playing field defended by the one team;
 c. operational-circuit means disposed in said housing and electrically connected to said display panel for generation and transmission of electrical signals to said display panel to produce symbols on said simulated playing field, said symbols including offensive-player symbols which simulate players of the team currently on offense, defensive-player symbols which simulate players of the team currently on defense, and a game-object symbol which simulates a game object in two modes, a control mode in which the game-object symbol moves with an offensive-player symbol to simulate the game object under control of that simulated offensive player, and an independent mode in which the game-object symbol moves independently of said player symbols, said operational-circuit means including:
  (i) means for moving at least one offensive-player symbol about said playing field and thereby moving said game-object symbol when the game object is simulated to be under the control of the offensive-player symbol being moved;
  (ii) means for moving at least one defensive-player symbol about said playing field;
  (iii) game-object movement means operable to move said game-object symbol independently of said player symbols when simulation of the game object is in said independent mode, said game-object movement means being operable to move said game object in a straight-line path to simulate a "pass" or a "shot" of the game object but, when at least one of said boundary lines is encountered by said game-object symbol, to divert said game-object symbol from the straight-line path and continue the independent motion of said game-object symbol along said boundary line;
  (iv) coincidence-detection means for detecting coincidence between said game-object symbol and a goal position during a simulated shot from a player symbol of the team associated with said goal position and thereby detecting a score;
  (v) means for monitoring play action to record information concerning the status of said simulated game and for producing signals indicative of said status information, said signals conveying the recorded information to an operator of the game; and
 d. a control board on said housing including a multiplicity of manually operable control elements electrically connected to said operational-circuit means for transmission of electrical signals thereto through manual operation of said control elements, at least one of said manually operable control elements being operable to transmit signals to said operational-circuit means to produce manually controlled movement of at least one of said offensive-player symbols, at least one of said manually operable control elements being operable to transmit signals to said operational-circuit means for production by said game-object movement means of the straight-line movement of said game-object symbol independent of said player symbols, whereby an operator can operate said manually operable control elements to move an offensive-player symbol having simulated control of said game-object symbol about said simulated playing field to avoid said defensive-player symbols and to put said offensive-player symbol into position for a "pass" or "shot" and then operate a manually operable control element to cause a simulated shot at said goal area.

* * * * *